Patented July 23, 1940

2,209,055

UNITED STATES PATENT OFFICE 2,209,055

PROCESS FOR CLEAVING MONOSACCHARIDES AND PREPARATION OF LOWER POLYHYDRIC ALCOHOLS THEREFROM

William E. Hanford, Wilmington, Del., assignor to E. I. du Pont de Nemours & Company, Wilmington, Del., a corporation of Delaware No Drawing. Application April 21, 1938, Serial No. 203,243

8 Claims. (Cl. 260—635)

This invention relates to processes for cleaving monosaccharides, and to the preparation of lower polyhydric alcohols from monosaccharides.

Polyhydric alcohols, such as glycerol, in the past have been produced from glucose, either by bacteriological methods or by methods involving reduction to sorbitol followed by hydrogenolysis of the sorbitol. In processes involving reduction to sorbitol, the hydrogenolysis step is carried out at such elevated temperatures that considerable loss of lower polyhydric alcohols occurs through decomposition.

The present invention provides a simple direct method for producing lower polyhydric alcohols from monosaccharides under milder conditions than has heretofore been possible and which therefore overcomes the defects inherent in prior art processes.

This invention has as an object the production of lower polyhydric alcohols from monosaccharides by an improved process. Another object is the production of glycerol from monosaccharides. Still another object is the cleaving of a monosaccharide; and still another object is the subsequent catalytic reduction of the cleavage products to lower polyhydric alcohols. Other objects will appear hereinafter.

The above objects are accomplished by cleaving a monosaccharide dissolved in a suitable solvent in the presence of a tertiary amine, at elevated temperatures, and then catalytically hydrogenating the reaction mixture while in contact with a catalyst having as an essential catalytic component a member of the iron group of the periodic table. In the preferred practice of the invention a monosaccharide, such as glucose, in aqueous solution is cleaved by heating it to between about 75° and about 150° C. in the presence of a tertiary amine and a hydrogenation catalyst having as an essential catalytic component a member of the iron group of the periodic table. The resulting reaction mixture without isolation is then hydrogenated at a temperature below 250° C.

Whereas the critical factor and inventive step in the production of lower polyhydric alcohols from monosaccharides resides in cleaving the monosaccharide in the presence of a tertiary amine, in actual practice it is preferred to have present, along with the tertiary amine, a hydrogenation catalyst having as an essential catalytic component a member of the iron group of the periodic table, preferably nickel. If desired, the cleavage products may be freed from the tertiary amine prior to hydrogenation, but in actual practice this has been found unnecessary.

For the purpose of illustrating this invention the following examples are set forth; these, however, are not to be considered as limitations of the invention since many modifications may be made without departing from the spirit and scope of said invention.

Example 1

One hundred grams of glucose dissolved in 150 cc. of water, 20 grams of pyridine, and 10 grams of Raney nickel catalyst were heated in a closed vessel under an atmosphere of hydrogen for 45 minutes at 100° C., and then reduced at the same temperature under 2000 to 3000 pounds pressure of hydrogen. The absorption of hydrogen was shown by the drop in the pressure gauge. When the gauge reading had become constant, the reaction mixture was cooled, the pressure released, and the hydrogenation catalyst removed by filtration. The resulting solution was fractionated by distillation. There were obtained 14.1 grams of propylene glycol-ethylene glycol mixture and 17.5 grams of a glycerol fraction.

The above example was duplicated using sorbitol; the sorbitol was recovered quantitatively from the reaction mixture.

Example 2

One hundred grams of glucose dissolved in 150 cc. of water, 24 grams of dimethyl aniline, and 10 grams of Raney nickel catalyst were autoclaved for one hour at 130° C. and then hydrogenated at the same temperature under a hydrogen pressure of 2000 to 3000 pounds per square inch until the absorption of hydrogen had stopped. The catalyst was removed by filtration, and the solution fractionally distilled. A yield of 20 per cent of polyhydric alcohols boiling within the range of 90° to 180° C. at 10 mm. was obtained.

Example 3

Forty grams of glucose dissolved in 160 cc. of water, 18 grams of pyridine, and 4 grams of Raney nickel were autoclaved for one hour at 130° C. and hydrogenated at the same temperature under a hydrogen pressure of 2000 to 3000 pounds per square inch. A 38% yield of polyhydric alcohols boiling at 85–150° C. at 4 mm. was obtained, 20% of which was the glycerol fraction.

Example 4

Forty grams of glucose dissolved in 160 cc. of water, 6 grams of pyridine, and 4 grams of nickel on kieselguhr were autoclaved for one hour at 130° C., and reduced at the same temperature until the absorption of hydrogen had stopped. The temperature was then elevated slowly to 250° C., and held at that point until the absorption of hydrogen had stopped. The catalyst was removed by filtration, and the solution fractionally distilled. A yield of 48% polyhydric alcohols boiling at 85° to 150° C. at 5 mm. was obtained, twenty-five per cent of which was the glycerol fraction.

*Example 5*

Forty grams of sucrose were dissolved in 160 cc. of water, and the sucrose hydrolyzed with 3 cc. of concentrated sulfuric acid. The acid was then neutralized with sodium hydroxide. To the solution was added 6 grams of pyridine, and 4 grams of Raney nickel. The reaction mixture was autoclaved in an atmosphere of hydrogen for one hour at 130° C., and then reduced at the same temperature at a hydrogen pressure of 2000 to 3000 pounds per square inch until the absorption of hydrogen had stopped. The catalyst was removed by filtration, and the solution fractionally distilled. A yield of 25% of polyhydric alcohols boiling between 85° to 150° C. at 5 mm. was obtained.

The cleavage reaction may be carried out at a temperature within the range of about 75° to about 150° C. The preferred temperature range for carrying out the cleavage reaction is between about 100° C. and about 150° C. In the hydrogenation step, temperatures ranging from about 75° C. to about 250° C. may be employed, and pressures ranging from atmospheric to a maximum determined by the practical limitations of the vessel in which the reaction is carried out. Generally, it is preferred to use temperatures from about 100° C. to about 150° C., and pressures from about 500 to about 4000 pounds per square inch.

An improvement in the yield of the desired lower polyhydric alcohol is obtained by carrying out the hydrogenation reaction as a two-step process, the first step of which involves hydrogenating at the temperature used in cleaving the monosaccharide until no more hydrogen is absorbed, and then raising the temperature from about 150° C. to about 250° C., and continuing the hydrogenation to completion. Example 4 shows this procedural variation in the mode of practicing the invention.

The upper temperature limit in the hydrogenation reaction is determined by the temperature at which undesirable side reactions take place. In actual practice this upper temperature limit has been found to be about 250° C. Below 75° C. the short chain aldoses and ketoses show no tendency to be reduced at a practical rate when catalysts having as an essential catalytic component a member of the iron group of the periodic table are used. The exact temperature employed for sfficient operation depends primarily upon the activity of the catalyst employed. Generally, the more active the catalyst, the lower the temperature at which the hydrogenation reaction may be carried out.

The catalysts for use in this process are those containing as their essential catalytic components members of the ferrous metal group; namely, iron, cobalt, and nickel—of these nickel is the preferred.

Any tertiary amine may be used in the practice of this invention. Suitable examples, in addition to those listed in the examples, are beta-diethyl-aminoethanol, trimethylamine, tripropylamine, methyl dipropylamines, triethanolamines, dimethyl cyclohexyl amine, etc.

In addition to the monosaccharides disclosed in the examples, fructose, anhydroglucose, and xylose have been found to give good yields of polyhydric alcohols. All monosaccharides are operative for the production of polyhydric alcohols. Polysaccharides may also be used for the production of polyhydric alcohols; however, they must be converted to monosaccharides prior to treatment in accordance with this process.

Water is the preferred solvent for carrying out this reaction. Other solvents or mixture of solvents, however, may be employed. From the point of view of commercial operation it is preferred to carry out the reaction in the presence of a solvent with the monosaccharide at a concentration of about 20%. The necessity of having to remove large volumes of water by using lower concentration makes the use of dilute solutions impractical. However, the concentration of the sugar does not affect the operativeness of the process.

The time required for the cleaving reaction depends upon the temperature employed. In actual practice it has been found that, operating at temperatures from about 100° C. to about 150° C., the minimum time required is about 30 minutes. It has further been found out that the cleavage reaction takes place very rapidly for a period of time and then gradually tapers off and for this reason no practical advantage from the standpoint of yield of lower polyhydric alcohol accrues by continuing the cleavage reaction beyond a certain period of time which appears to be about two hours. Maximum cleavage appears to occur between about 45 minutes and about 1½ hours depending upon the particular temperature employed.

Glycerol may be obtained in improved yields by this process. This invention also offers the advantage that glycerol and other polyhydric alcohols may be obtained from glucose at a much lower temperature than methods involving hydrogenolysis. In this process cleavage occurs under non-hydrogenating conditions, whereas in other methods cleavage occurs under hydrogenating conditions. Hydrogenation is carried out under mild conditions in the present invention; in the prior art hydrogenation required drastic conditions. A low temperature of production minimizes the possibility of continued reduction of the polyhydric alcohols to monohydric alcohols, and probably cuts down materially the formation of methyl glycerol.

It is apparent that many widely different embodiments of this invention may be made without departing from the spirit and scope thereof and therefore it is not intended to be limited except as indicated in the appended claims.

I claim:

1. A process for the production of lower polyhydric alcohols from monosaccharides which comprises bringing a monosaccharide into contact with a tertiary amine at an elevated temperature of about 75° to about 150° C. and then subjecting the resulting mixture to catalytic hydrogenation in the presence of a catalyst having as an essential catalytic component a member of the iron group of the periodic table.

2. A process for cleaving a monosaccharide which comprises bringing same into contact with a tertiary amine at an elevated temperature of about 75° to about 150° C.

3. A process for the production of lower polyhydric alcohols which comprises bringing a monosaccharide in solution into contact with a catalyst having as an essential catalytic component a member of the iron group of the periodic table and a tertiary amine at a temperature between about 75° and about 150° C. for sufficient length of time to effect at least a partial cleavage of said monosaccharide, bringing the resulting mixture into contact with hydrogen at a temperature between about 75° and about 250° C., and thereby catalytically hydrogenating the products.

4. The process in accordance with claim 3 characterized in that the reaction for cleaving the monosaccharide is carried out at a temperature between about 100° and about 150° C. and the process for catalytically hydrogenating the cleavage product is carried out between about 100° and about 250° C.

5. A process for the production of lower polyhydric alcohols which comprises bringing a monosaccharide in aqueous solution into contact with nickel and a tertiary amine at a temperature between about 100° and about 150° C. for sufficient length of time to effect at least a partial cleavage of said monosaccharide, and bringing into contact with said mixture hydrogen at a temperature between about 100° and about 250° C., and under a superatmospheric pressure, and thereby effecting the catalytic hydrogenation of the product.

6. The process in accordance with claim 5 characterized in that the hydrogenation reaction is carried out in two steps: first, at a temperature between about 100° and about 150° C. until hydrogen absorption ceases, and then increasing the temperature to between about 150° and about 250° C. so as to complete the hydrogenation reaction.

7. A process for the production of lower polyhydric alcohols which comprises catalytically hydrogenating at a temperature between about 100° and about 250° C. in the presence of a nickel catalyst the product obtainable by bringing a monosaccharide in aqueous solution into contact with a tertiary amine at a temperature between about 100° and about 150° C., said hydrogenation reaction being characterized in that it is carried out in two steps: first, at a temperature between about 100° and about 150° C. until hydrogen absorption ceases, and then increasing the temperature to between about 150° and about 250° C. so as to complete the hydrogenation reaction.

8. A process for the production of lower polyhydric alcohols which comprises bringing an aqeous solution of glucose into contact with pyridine and a nickel catalyst at a temperature between about 100° and about 150° C. for between about 45 minutes and about one-half hour, then bringing the resulting mixture into contact with hydrogen at a temperature between about 100° and about 150° C. and under a pressure of about 2000 to about 3000 pounds per square inch until hydrogen absorption ceases, and elevating the temperature to between about 150° and about 250° C. so as to complete the hydrogenation reaction

WILLIAM E. HANFORD.